Sept. 22, 1925.
H. A. BENEDICT ET AL
OILER FOR BEARINGS
Filed Nov. 4, 1924
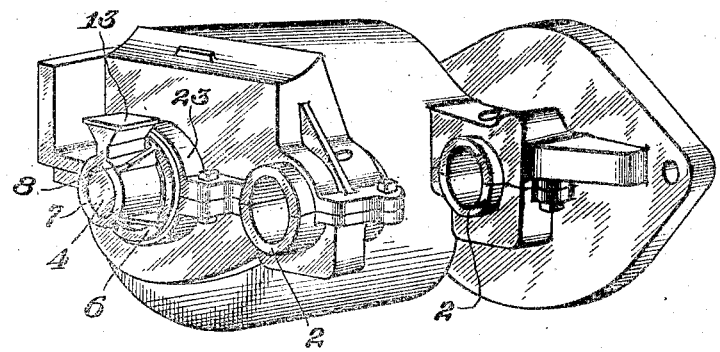
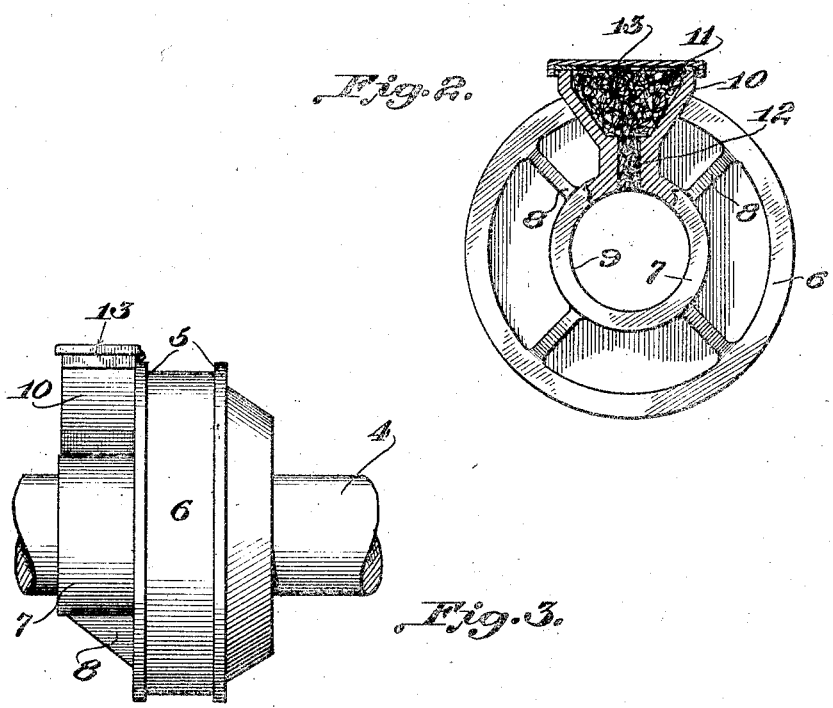
Inventors
Herschel A. Benedict,
Edward M. Moller,
By Mason Fenwick & Lawrence
Attorneys Sept. 22, 1925.  1,554,978
H. A. BENEDICT ET AL
OILER FOR BEARINGS
Filed Nov. 4, 1924  2 Sheets-Sheet 2

Inventors
Herschel A. Benedict,
Edward M. Moller.

By Mason Fenwick & Lawrence
Attorneys

Patented Sept. 22, 1925.

1,554,978

UNITED STATES PATENT OFFICE.

HERSCHEL A. BENEDICT, OF EAST ORANGE, AND EDVARD M. MOLLER, OF SOUTH ORANGE, NEW JERSEY.

OILER FOR BEARINGS.

Application filed November 4, 1924. Serial No. 747,817.

*To all whom it may concern:*

Be it known that we, HERSCHEL A. BENEDICT and EDVARD M. MOLLER, citizens of the United States, residing at East Orange and South Orange, respectively, in the county of Essex and State of New Jersey, have invented certain new and useful Improvements in Oilers for Bearings; and we do hereby declare the following to be a full, clear, and exact description of the invention, such as will enable others skilled in the art to which it appertains to make and use the same.

Our invention relates generally to oilers for the bearings of shafts and axles and is especially designed for oiling the bearings, shafts and axles of electric car wheel motors.

To these ends our invention consists briefly of a bearing provided with an upper funnel shaped box to contain the waste and oil and leading by an oil duct downward through the bearing to the bearing surface of the same and of the shaft or axle, substantially as hereafter described and claimed.

In order that our invention may be fully understood we shall first describe in detail the mode in which we at present prefer to carry our invention into practice and then particularly point out the novel features of the invention in the claims.

Reference is to be had to the accompanying drawings forming part of this application in which like parts are designated by the same numbers in all the figures.

Figure 1 is a perspective view showing our improved oiler applied to an armature shaft bearing for an electric car wheel motor.

Figure 2 is an enlarged end, partly sectional view of the same.

Figure 3 is a sectional side elevation of the same.

Figure 4:
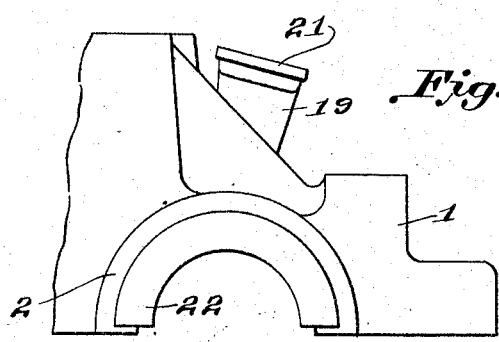
Figure 4 is an end elevation showing our improved oiler applied to an (half) axle bearing for a car wheel.

In the drawings, 1 designates the sectional housing for the motor and axle of an electric car wheel motor, formed with a sleeve 23 to receive and hold the bearing 9 of the armature and pinion shaft 4, and with aligned sleeves 2 to receive the bearings of the wheel axle 3.

As shown in Figures 1, 2 and 3, we prefer to form the armature shaft bearing 9 with a circular head portion 6 having peripheral flanges 5 to fit closely within a correspondingly formed chamber in the housing and its sleeve 23, and a concentric inner hub portion 7 to project through and outside the housing sleeve 23, the shaft bearing 9 extending continuously through the head and hub portions 5 and 7 respectively, which are strengthened by approximately radial ribs 8.

Rising from the hub portion 7 of the bearing outside the housing sleeve 23, I prefer to form a funnel shaped waste box 10, leading downward through an oil duct 12, to the bearing surface of the shaft 4, so that by filling the funnel shaped box 10 and the duct 12 with waste 11 and oil, the oil will be fed by gravity effectually and continuously to the bearing surface of the shaft 4.

We prefer to fit a removable cover 13 over the open top of the waste box 10, for filling, replacing and enclosing the waste and oil therein.

Figure 5:
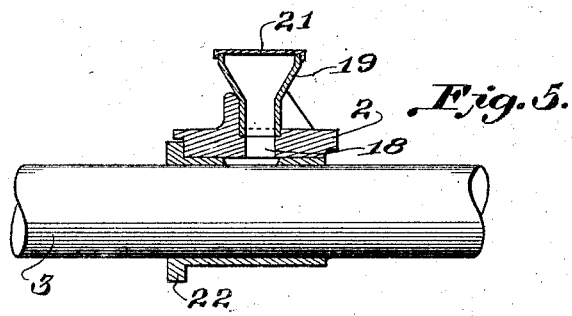
Figure 5 is a sectional side elevation of the same.
Figure 6:
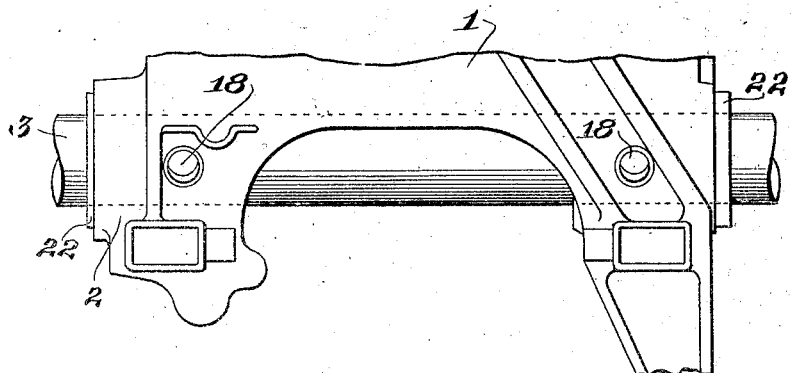
Figure 6 is a plan view of the said axle bearing.

In Figures 4, 5 and 6, we have shown our improved oiler applied to the wheel axle bearing 22, the oil duct 18 being carried through the axle bearing 22 and the bearing sleeve 2, and the funnel shaped waste and oil box 19, being formed with a lower tubular extension which is forced or otherwise held in the oil duct 18.

We claim as our invention.

1. A removable shaft or axle bearing comprising a head portion, a hub portion projecting axially therefrom, a bore common to said head and hub parts, a funnel shaped waste and oil box rising from the hub portion and an oil duct descending from the waste and oil box into the bore of the bearing.

2. A removable shaft or axle bearing comprising a peripherally flanged head portion, a hub portion extending axially therefrom, a bore common to said head and hub parts, a funnel shaped waste and oil box rising from the hub portion and an oil duct descending from the waste and oil box into the bore of the bearing.

In testimony whereof we affix our signatures.

HERSCHEL A. BENEDICT.
EDVARD M. MOLLER.